(12) United States Patent
Yore et al.

(10) Patent No.: US 12,124,649 B2
(45) Date of Patent: Oct. 22, 2024

(54) PREVENTING ACCIDENTAL MEDIA DEVICE COMMANDS

(71) Applicant: Sonos, Inc., Santa Barbara, CA (US)

(72) Inventors: Jason Yore, Santa Barbara, CA (US); Arthur Wu, Santa Barbara, CA (US); Ryan Purdy, Santa Barbara, CA (US)

(73) Assignee: SONOS, INC., Goleta, CA (US)

( * ) Notice: Subject to any disclaimer, the term of this patent is extended or adjusted under 35 U.S.C. 154(b) by 0 days.

(21) Appl. No.: 18/339,434

(22) Filed: Jun. 22, 2023

(65) Prior Publication Data

US 2023/0418406 A1 Dec. 28, 2023

Related U.S. Application Data

(60) Provisional application No. 63/354,956, filed on Jun. 23, 2022.

(51) Int. Cl.
*G06F 3/0488* (2022.01)
*G06F 3/041* (2006.01)

(52) U.S. Cl.
CPC ........ *G06F 3/04164* (2019.05); *G06F 3/0488* (2013.01)

(58) Field of Classification Search
None
See application file for complete search history.

(56) References Cited

U.S. PATENT DOCUMENTS

| | | | |
|---|---|---|---|
| 5,440,644 A | 8/1995 | Farinelli et al. | |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | Dilorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.

(Continued)

*Primary Examiner* — Duane N Taylor, Jr.
(74) *Attorney, Agent, or Firm* — Workman Nydegger

(57) ABSTRACT

A playback device detects, with one or more onboard sensors, that the playback device is in motion. The playback device activates a command bypass mode. The command bypass mode causes the playback device to not execute commands applied to a touch-sensitive user interface integrated into the playback device. The playback device then detects, with the one or more onboard sensors, that the playback device is stationary. After detecting that it is stationary, the playback device deactivates the command bypass mode.

20 Claims, 14 Drawing Sheets

(56) References Cited

U.S. PATENT DOCUMENTS

| | | |
|---|---|---|
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2016/0044151 A1* | 2/2016 | Shoemaker ............ H04M 19/02 455/556.1 |
| 2016/0050308 A1* | 2/2016 | Liu ........................ H04W 4/00 455/411 |
| 2016/0248899 A1* | 8/2016 | Lee ...................... H04M 1/724 |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

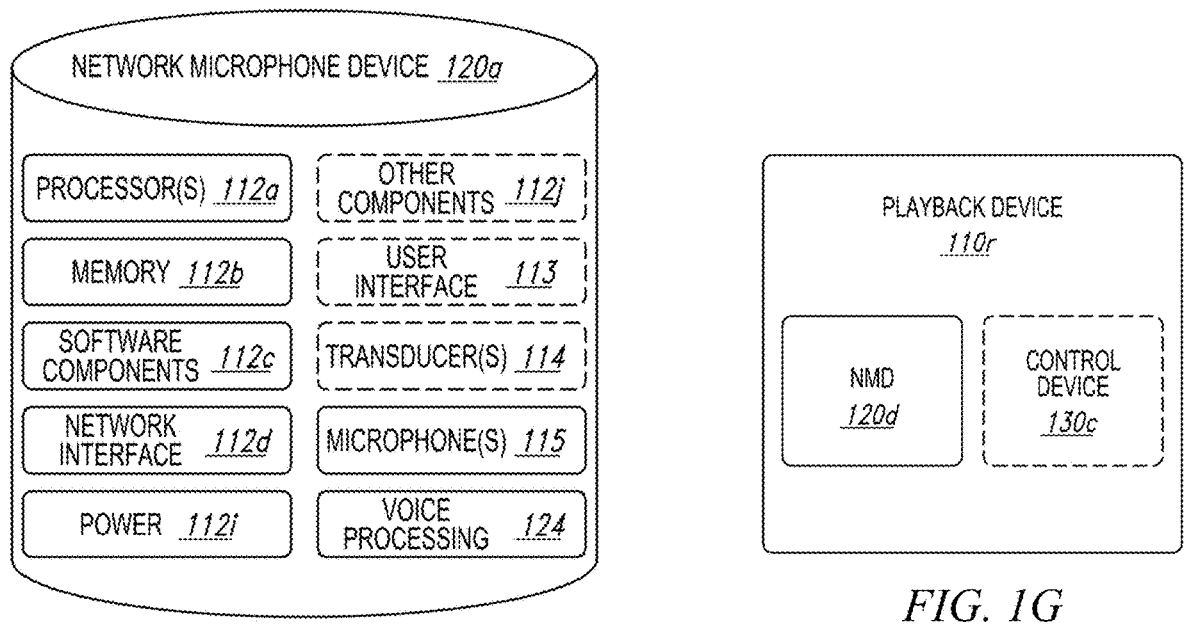
*FIG. 1F*
*FIG. 1G*
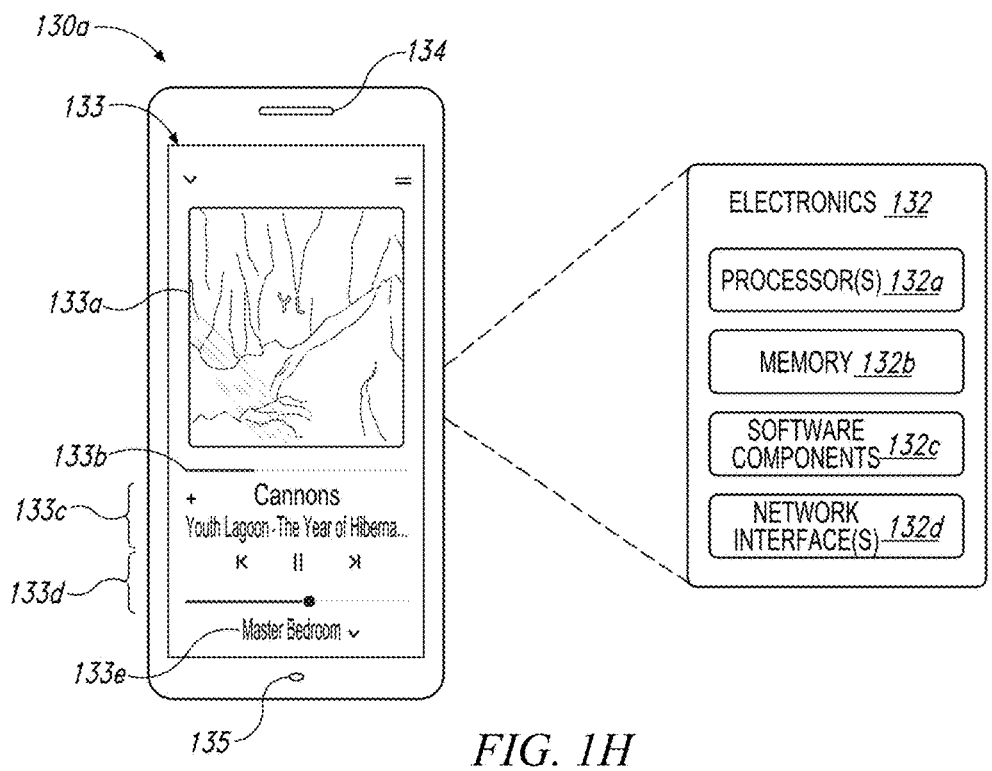
*FIG. 1H*

PREVENTING ACCIDENTAL MEDIA DEVICE COMMANDS

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partial schematic diagram of a control device.

Figure 1A:
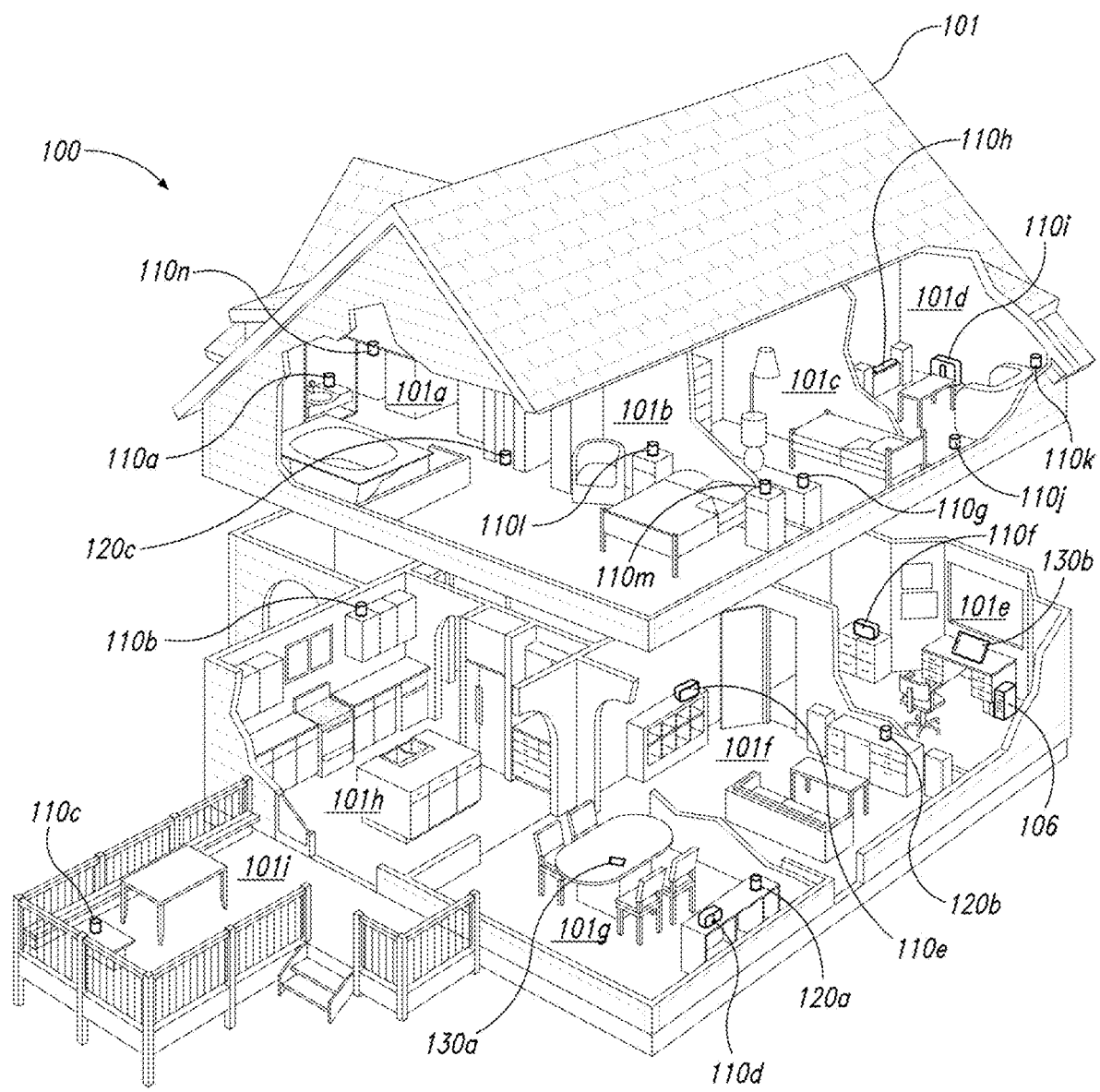
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to preventing accidental media device commands. For example, disclosed embodiments include playback devices that detect when a user interface command may have been unintentional. In response to detecting that a command may be unintentional, the playback devices disregards the command and/or prevents that command from being received.

In some embodiments, for example, a playback device detects, with one or more onboard sensors, that the playback device is in motion. The playback device activates a command bypass mode. The command bypass mode causes the playback device to not execute commands applied to a touch-sensitive user interface integrated into the playback device. The playback device then detects, with the one or more onboard sensors, that the playback device is stationary. After detecting that it is stationary, the playback device deactivates the command bypass mode.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a main bathroom 101*a*, a main bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, main bathroom 101*a*, main bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the main bathroom 101*a*, the second bedroom 101*c*, the office 101*e*, the living room 101*f*, the dining room 101*g*, the kitchen 101*h*, and the outdoor patio 101*i* each include one playback device 110, and the main bedroom 101*b* and the den 101*d* include a plurality of playback devices 110. In the main bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
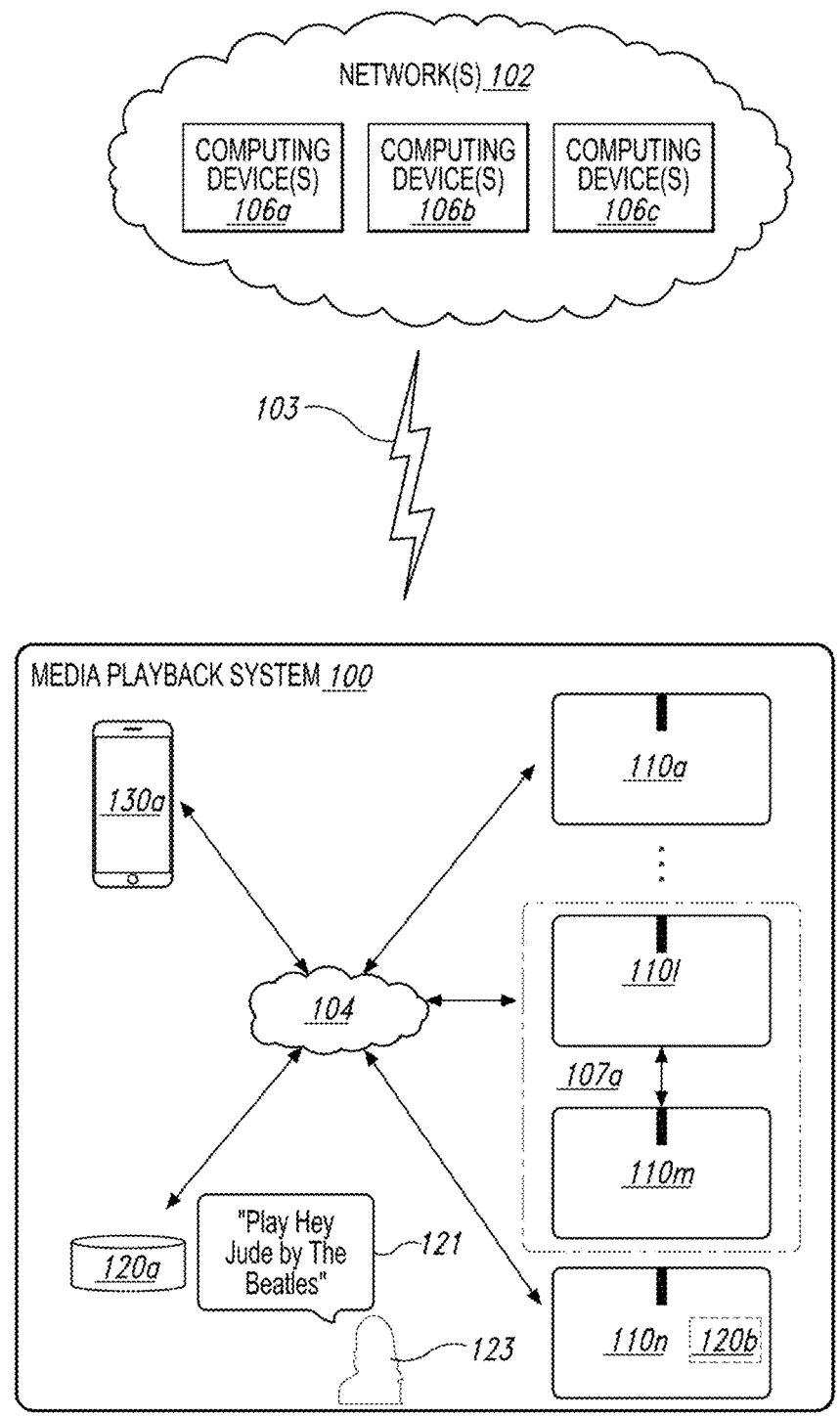
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/ or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) facilitate one or more operations on behalf of the media playback system 100.

In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103.

In response to receiving the voice input data, the computing device 106c processes the voice input data (i.e., "Play Hey Jude by The Beatles"), and determines that the processed voice input includes a command to play a song (e.g., "Hey Jude"). In some embodiments, after processing the voice input, the computing device 106c accordingly transmits commands to the media playback system 100 to play back "Hey Jude" by the Beatles from a suitable media service (e.g., via one or more of the computing devices 106) on one or more of the playback devices 110. In other embodiments, the computing device 106c may be configured to interface with media services on behalf of the media playback system 100. In such embodiments, after processing the voice input, instead of the computing device 106c transmitting commands to the media playback system 100 causing the media playback system 100 to retrieve the requested media from a suitable media service, the computing device 106c itself causes a suitable media service to provide the requested media to the media playback system 100 in accordance with the user's voice utterance.

b. Suitable Playback Devices

Figure 1C:
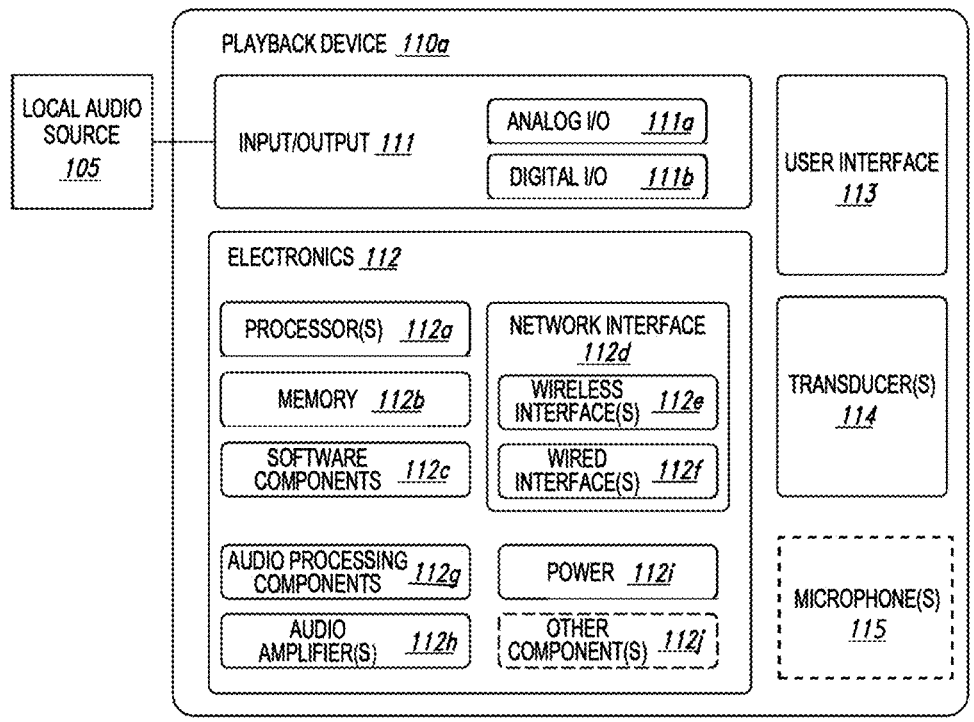
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
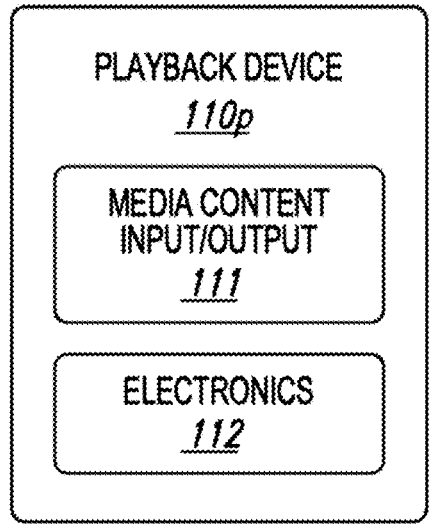
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
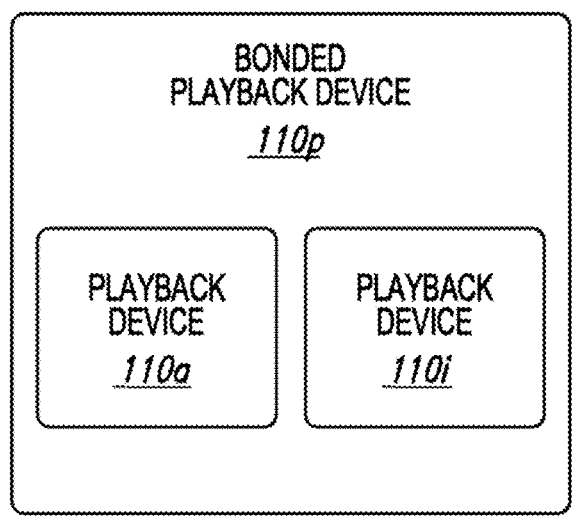
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3D.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

III. Example Systems and Devices

Figure 2A:
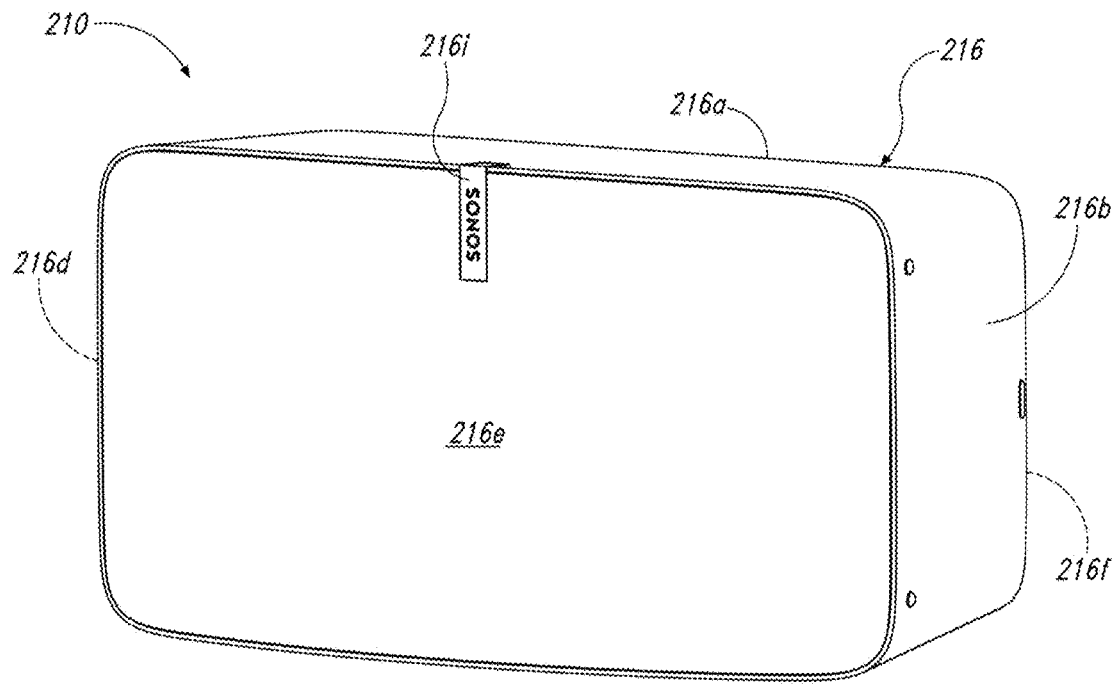
FIG. 2A is a front isometric view of a playback device configured in accordance with aspects of the disclosed technology.
Figure 2B:
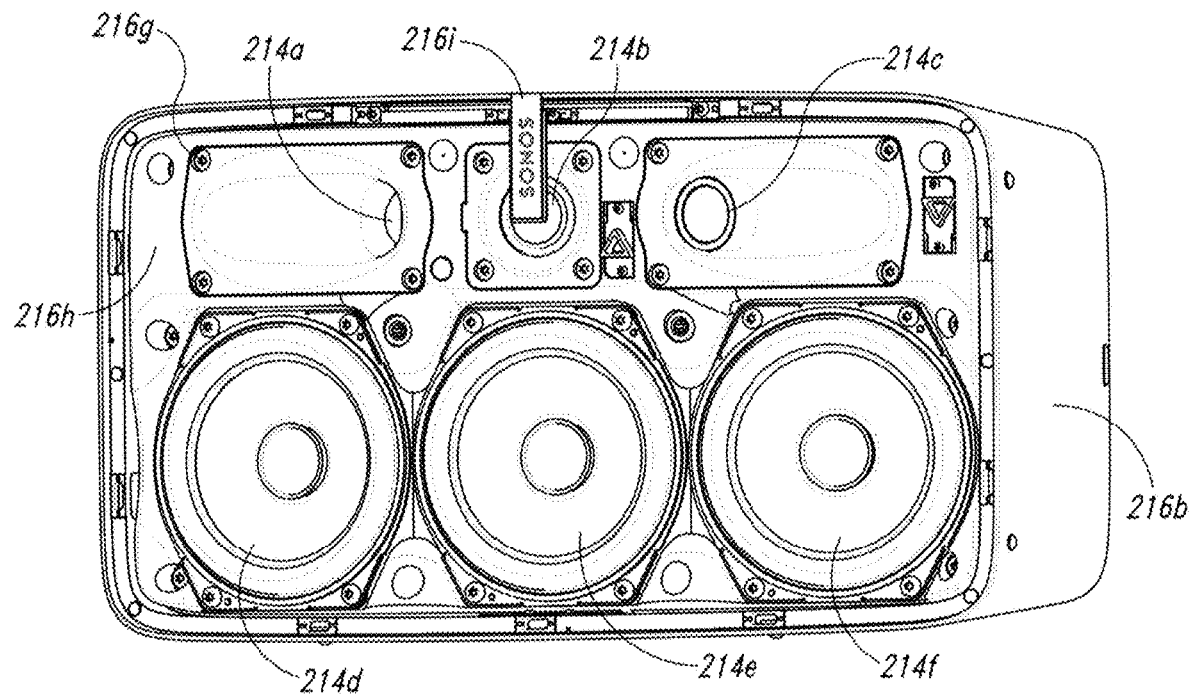
FIG. 2B is a front isometric view of the playback device of FIG. 3A without a grille.
Figure 2C:
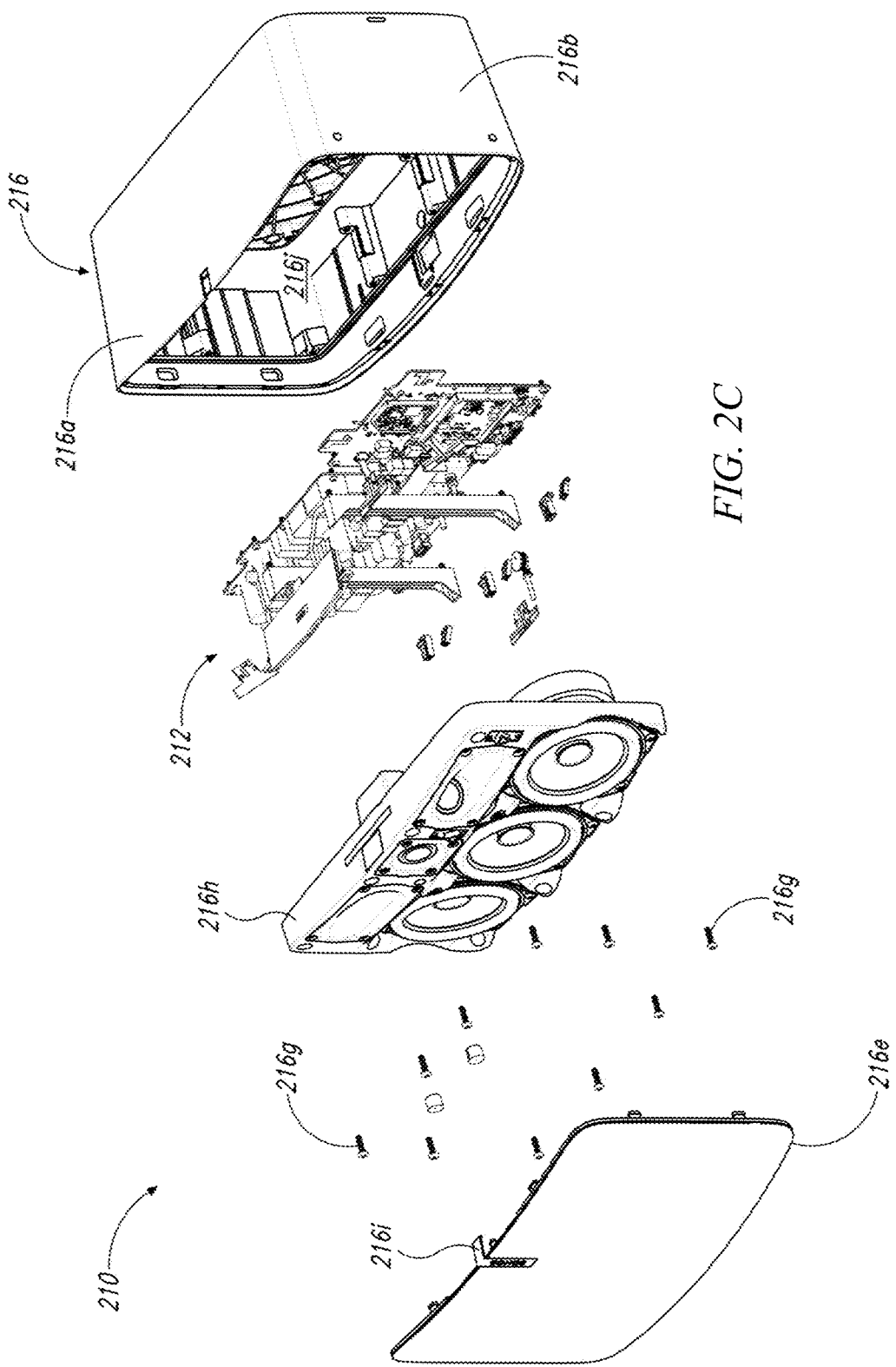
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
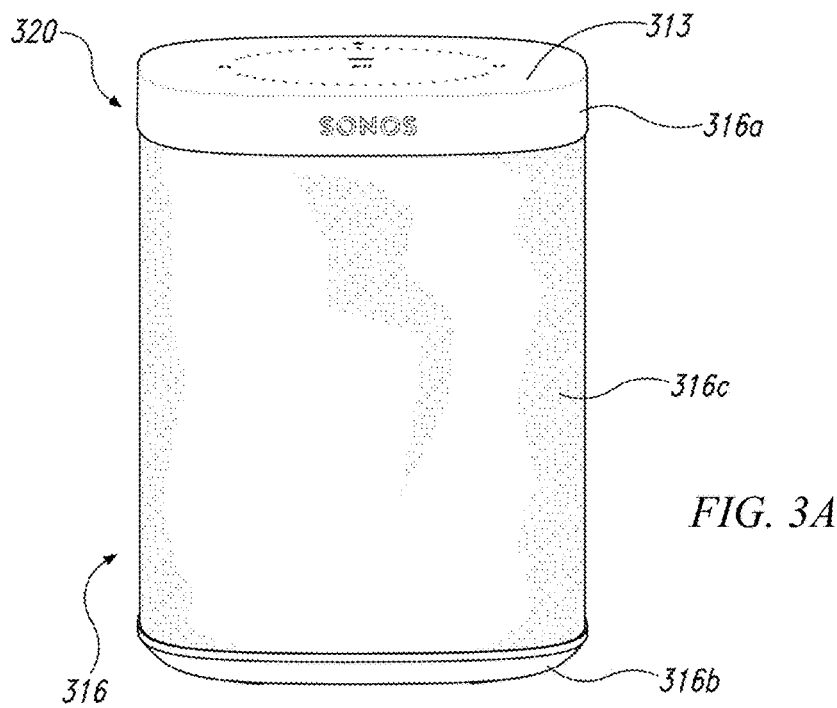
FIG. 3A is a front view of a network microphone device configured in accordance with aspects of the disclosed technology.
Figure 3B:
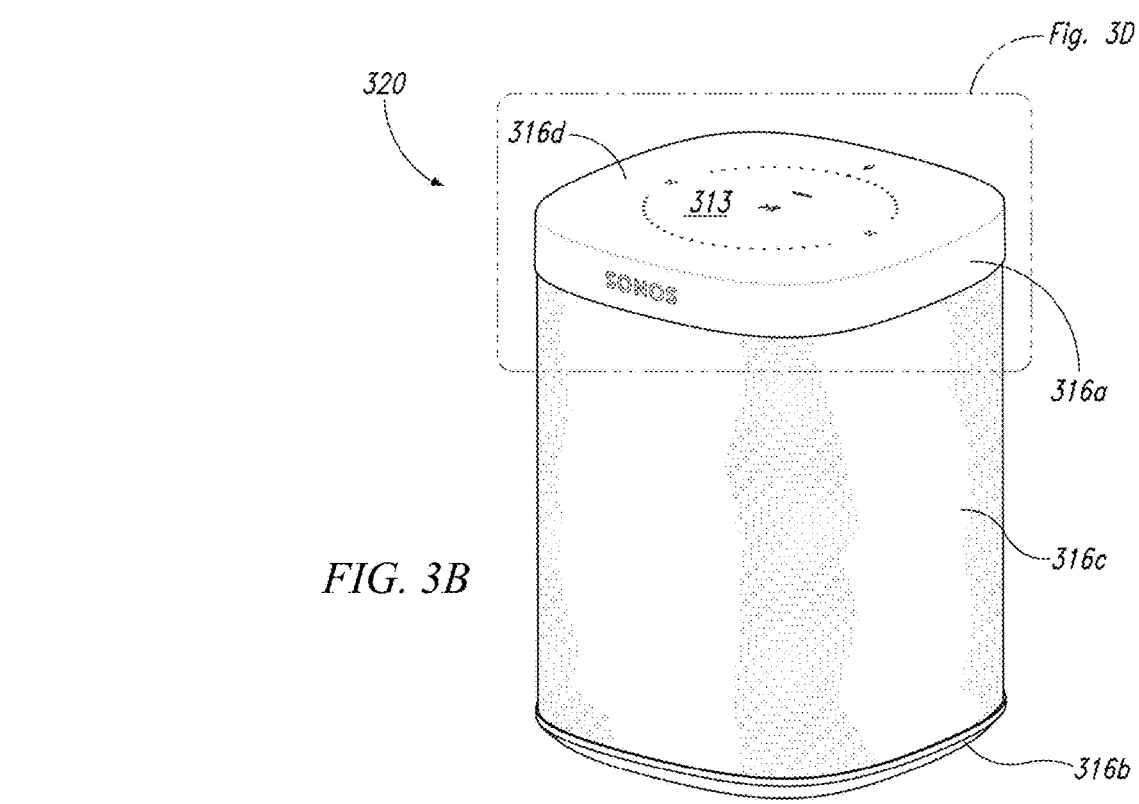
FIG. 3B is a side isometric view of the network microphone device of FIG. 3A.
Figure 3C:
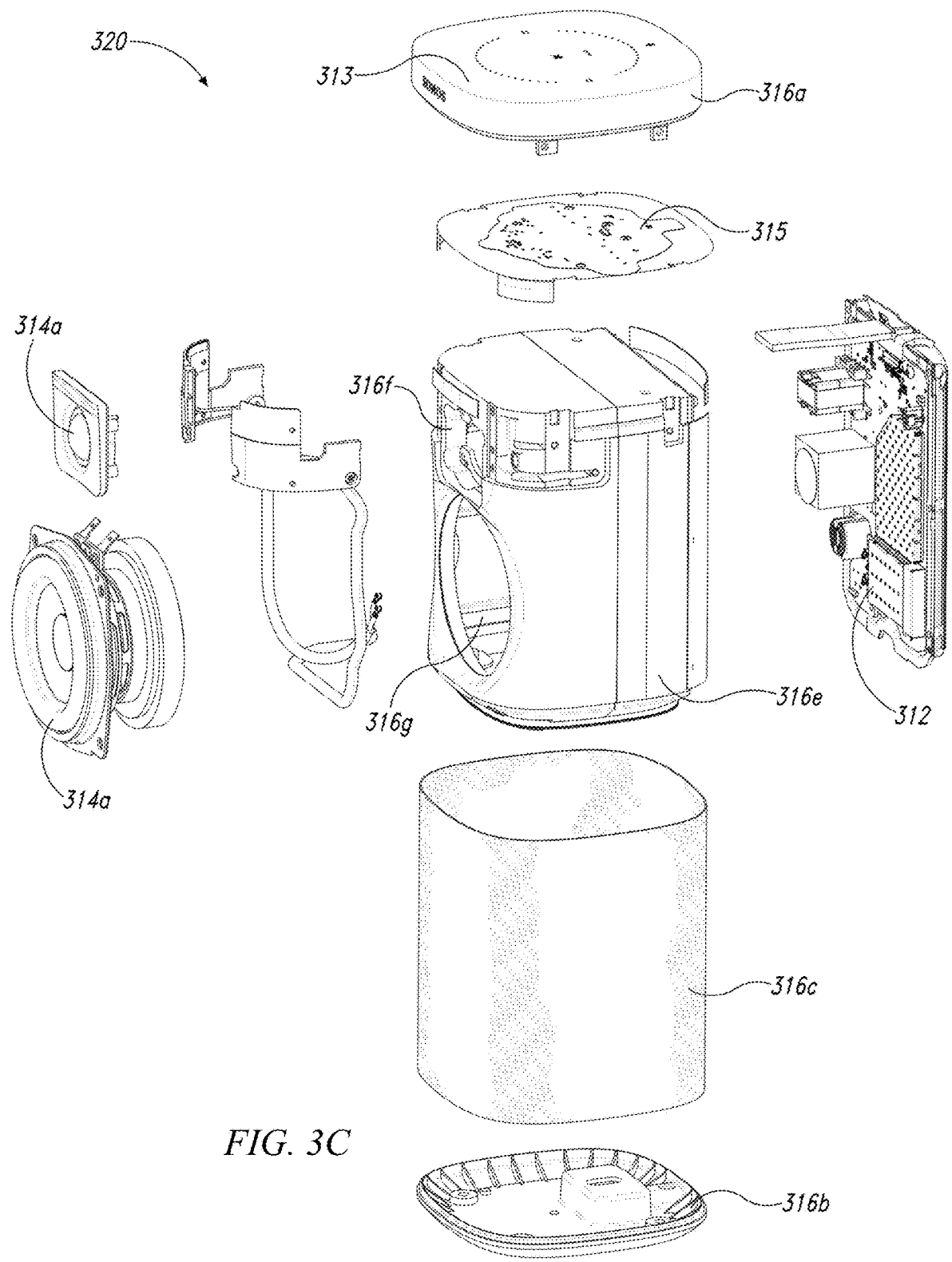
FIG. 3C is an exploded view of the network microphone device of FIGS. 3A and 3B.
Figure 3D:
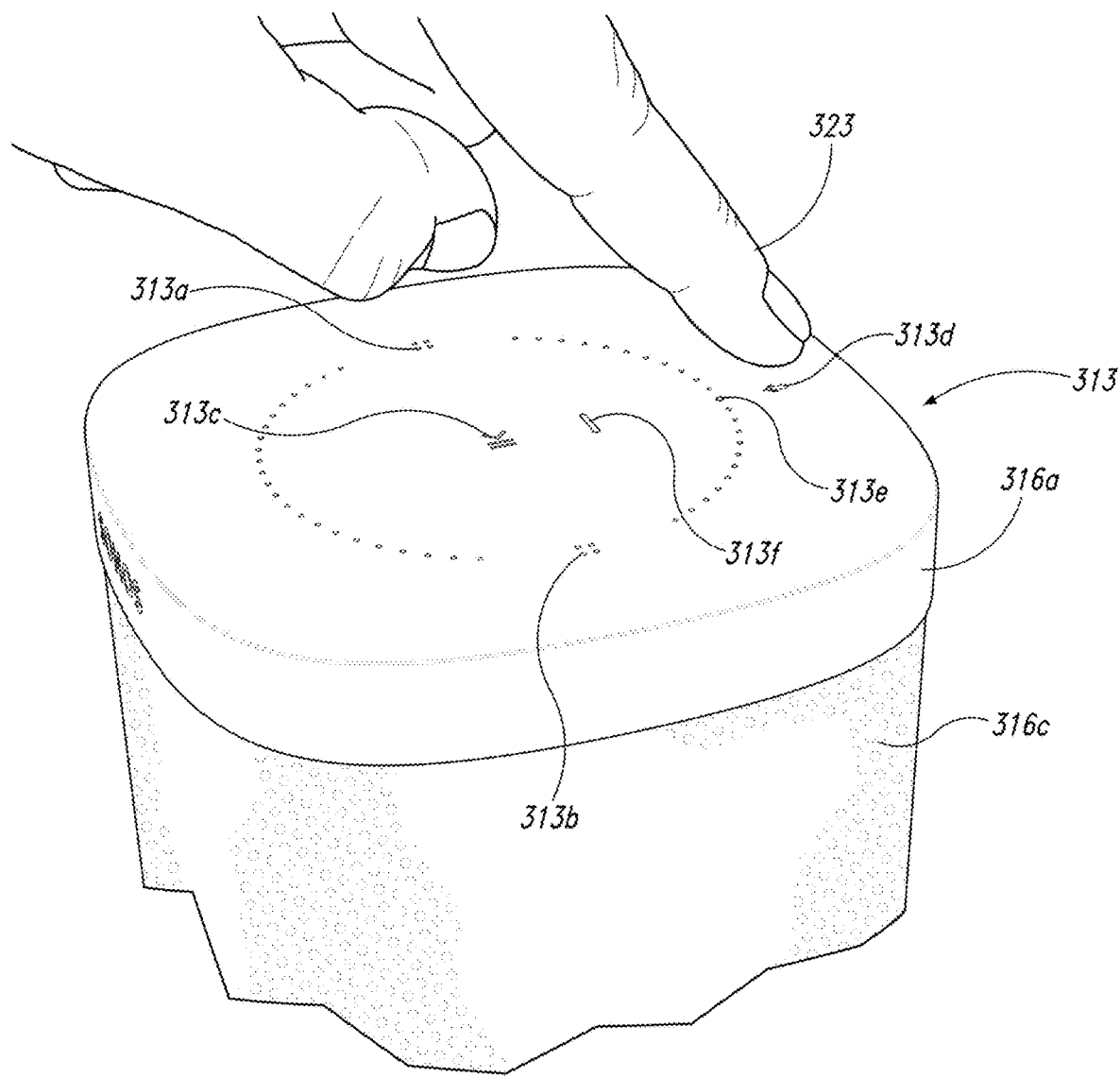
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces, inductive surfaces, etc.) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

IV. Button Press Mitigations

Figure 4A:
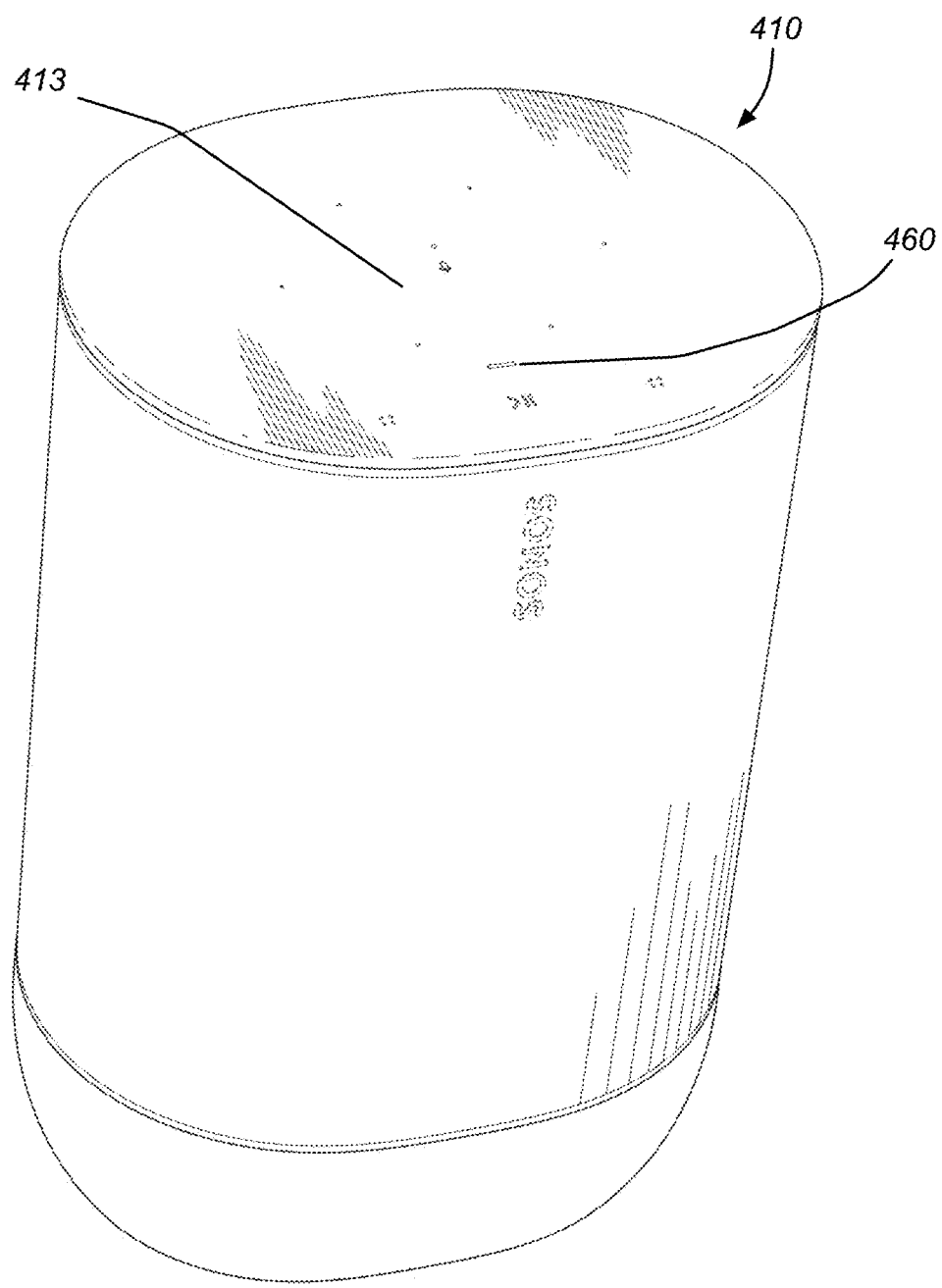
FIG. 4A is a perspective view of a portable playback device.

FIG. 4A is a perspective view of a playback device 410 configured in accordance with aspects of the disclosed technology. In particular, the depicted playback device 410 comprises a portable playback device 410 that comprises an integrated power source, such as a battery. The portable playback device 410 is configured to be carried and moved by a user prior to use, after use, and during use. As such, the portable playback device 410 may playback media content while a user is carrying or moving the device. For instance, a user may wish to listen to a particular song while he eats dinner on his outdoor patio 101i. Accordingly, the user may move the portable playback device 410 from a position inside a home to a position on the outdoor patio 101i. In some use cases, the portable playback device 410 may already be playing the particular song within the home when the user picks up the device and transports it to the outdoor patio 101i. In such a scenario, the user can continue to listen to the particular song that was playing in the house while he carries the portable playback device 410 to the outdoor patio 101i.

The ability to seamlessly move a portable playback device 410 from one location to another while listening to the playback of desired media content can greatly increase the enjoyment that a user experiences in listening to the audio content of his or her choice. However, a potential challenge can arise when a user grasps the portable playback device 410 in a manner that may accidently interact with a user interface 413 on the portable playback device 410. For example, when the user picks up the portable playback device 410, the user may grab the device by the top and unintentionally trigger one or more actions. For instance, the user may stop the music, skip a song, change the volume, or perform some other similar unintended action simply by brushing up against a touch-sensitive control surface.

Accordingly, in some embodiments, the portable playback device 410 may utilize button-press mitigations that are configured to prevent and/or mitigate accidental button presses that may occur during movement of a portable playback device 410. As described here, a portable playback device 410 may comprise a communication interface, at least one processor, and at least one non-transitory computer-readable medium comprising program instructions that are executable by the at least one processor such that the playback device is configured to implement a button press mitigation protocol.

The playback device 410 (also referred to as the "portable playback device 410") may comprise one or more onboard sensors (e.g., integrated into electronics 312 of FIG. 3C). The one or more onboard sensors may comprise movement sensors, such as but not limited to one or more accelerometers or one or more gyroscopes. The movement sensors are configured to detect actual movement of the portable playback device 410.

Additionally or alternatively, the one or more onboard sensors may comprise sensors that infer motion. For example, the one or more onboard sensors may comprise touch-sensitive guard sensors that detect when a user's hand is outside an expected button boundary. The one or more onboard sensors may comprise a proximity sensor that detects the relative position of the portable playback device 410 from one or more external devices. Additionally or alternatively, the one or more onboard sensors may comprise a power circuit that determines when the portable playback device 410 has been disconnected from an external power source, such as an outlet or docking station. Further, the one or more onboard sensors may comprise touch sensors (e.g., capacitive sensors) built into a carrying handle such that the one or more onboard sensor are able to detect when a user has grasped the carrying handle. Accordingly, the one or more onboard sensors may comprise sensors that can be used to infer motion.

When the one or more onboard sensors detect that the portable playback device 410 is in motion, the portable playback device 410 activates a command bypass mode. As used herein, the "command bypass mode" refers to a mode that causes the portable playback device 410 to not execute commands applied to an interface (e.g., a touch-sensitive user interface) integrated into the portable playback device 410. As will be explained in greater detail below, the command bypass mode may cause the portable playback device 410 to not detect specific user inputs and/or to not execute actions in response to detected specific user inputs. Specific buttons and/or specific areas of a user interface may be placed within the command bypass mode, while other areas may be left to function as normal.

The command bypass mode may be considered a "just-in-time" rejection that occurs when the portable playback device 410 detects that the user's hands are near on-device control buttons. For example, the command bypass mode may reject commands when the one or more onboard sensors detect a hand on a carrying handle and a hand on a touch-sensitive user interface. Additionally or alternatively, the command bypass mode may automatically reject commands during the duration that it is active.

In some embodiments, when the command bypass mode is activated, the portable playback device 410 provides a visual indication that the con and bypass mode is active. For example, the portable playback device 410 may cause an indicator light 460 to blink a particular color to visually indicate to a user that the user interface is not currently active due to the command bypass mode. Additionally or alternatively, a control device 130a (such as interface 133 on a mobile phone) may provide a visual indication that the portable playback device 410 is currently in a command bypass mode. As explained below, the control device 130a may still be capable of issuing commands to the portable playback device 410 even while the portable playback device 410 is in the command bypass mode.

When the one or more onboard sensors detect that the portable playback device 410 is stationary, the portable playback device 410 deactivates the command bypass mode. Once the command bypass mode is deactivated, the portable playback device 410 receives commands through its user interface as normal. Accordingly, while the portable playback device 410 is detected to be in motion, the command bypass mode prevents unintentional user interface interactions from being acted upon by the portable playback device 410.

In some embodiments, the command bypass mode only impacts a specific set of user inputs. For example, the command bypass mode may only relate to user inputs received through a touch interface, such as a capacitive button or a physical button. In contrast, the command bypass mode may not block or otherwise impede voice commands. As such, a user may be able to issue voice commands to the portable playback device 410 while the device is in motion and while the device is in command bypass mode. Such voice commands can be received and acted upon by the portable playback device 410. However, the command bypass mode may mitigate against commands received through a physical touch interface, such that unintentional physical interactions with the portable playback device 410 do not cause the portable playback device 410 to execute actions, while verbal commands are allowed to cause the portable playback device 410 to perform the requested actions.

Figure 4B:
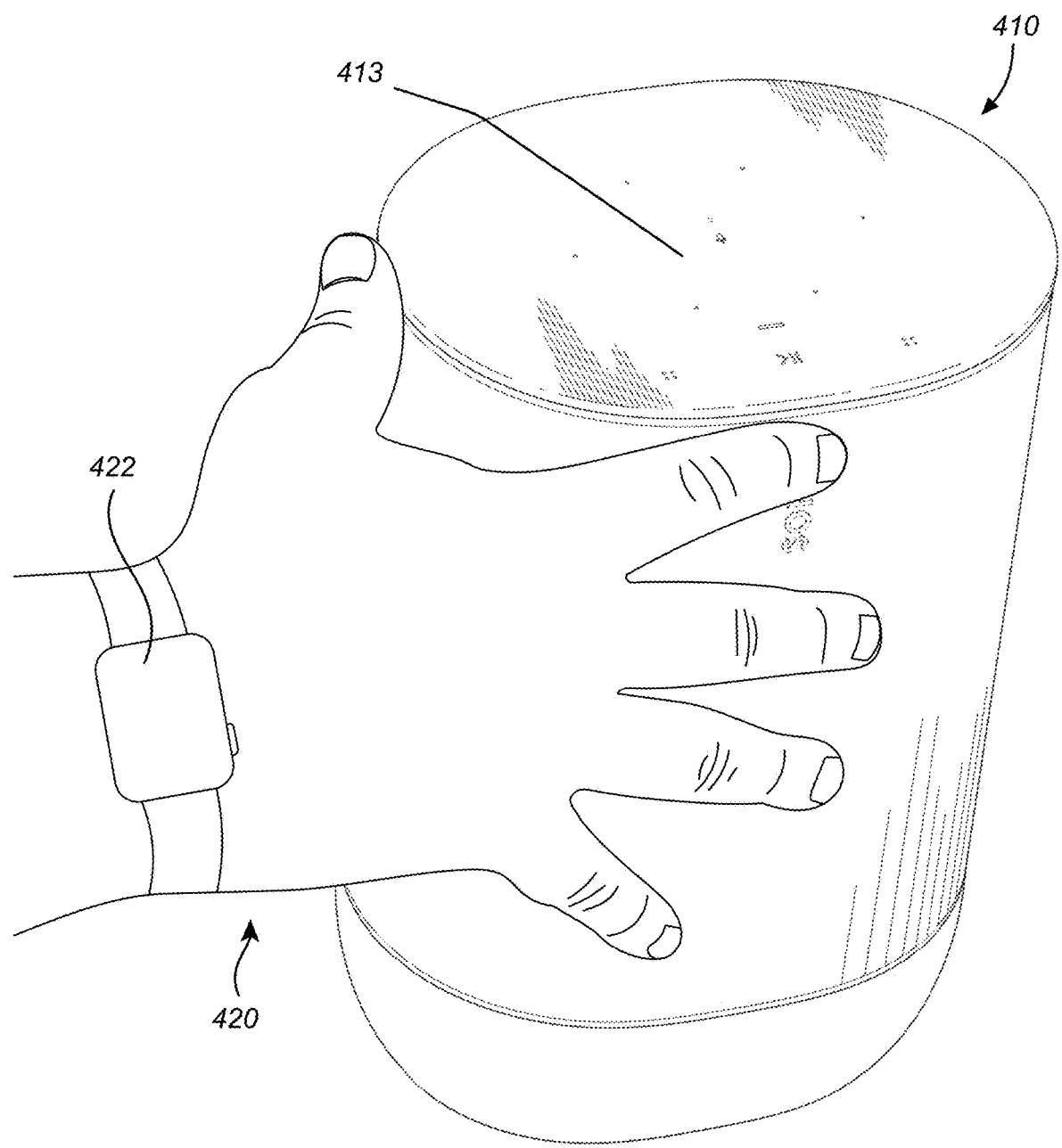
FIG. 4B is a view of a portable playback device being moved.

FIG. 4B depicts the portable playback device 410 being moved in a user's hand 420. As described above, in at least one embodiment, the portable playback device 410 is configured to receive a sensor reading from one or more movement sensors. The one or more movement sensors may comprise, but are not limited to, at least one of an accelerometer, a capacitive sensor, an inductive sensor, or a gyroscope. Based on the sensor reading indicating movement, the portable playback device 410 generates a digital indication that the portable playback device 410 is in motion.

In some embodiments, the forces detected by the movement sensors are compared to various pre-stored activity profiles to determine what type of movement has occurred. For example, the pre-stored activity profiles may comprise a force profile associated with the portable playback device 410 being knocked over and picked back up. The force profile may be generated experimentally by intentionally knocking over various portable playback devices 410 and recording the resulting movement sensor readings. The movement sensor readings can be taken at periodic or aperiodic points in time over the movement period. The readings can include sensor position in two-dimensional and/or three-dimensional space, acceleration, speed, direction of movement, etc. Various other exemplary force profiles may include, but are not limited to, a force profile corresponding to picking up and moving the portable playback device 410 without walking, a force profile corresponding to walking, a force profile corresponding to the movements of a boat or vehicle, and various other force profiles. The detection of some force profiles may cause the generation of a digital indication of movement and cause the command bypass mode to activate, while other force profiles may not activate the command bypass mode (e.g., the force profile associated with the movements of a boat).

In some embodiments, the portable playback device 410 may activate the command bypass mode when the accelerometer, the inductive sensor, the capacitive sensor, and/or the gyroscope detect a force that exceeds a movement threshold. The movement threshold may be hard-coded into the instructions of the portable playback device 410 or may be dynamically adjustable based upon historical data received by the one or more movement sensors. For example, if the sensor readings have remained relatively stable for a period of time then a relatively lower detected force may be interpreted as movement of the portable playback device 410. In contrast, if the sensor readings indicate some ongoing force or speed greater than walking speed applied to the portable playback device 410 then a relatively higher level of detected force may be required before generating the digital indication that the portable playback device 410 is in motion. For example, the portable playback device 410 may comprise a pre-stored activity profile in the form of a vehicle profile. The vehicle profile may be a force profile associated with the movements of one or more vehicles, such as a car or on a boat or a bike. In the case that a vehicle profile (or some other profile associated with expected motion) is detected, it would be expected that the accelerometer and/or the gyroscope would detect some force readings; however, it would not be desirable to activate the command bypass mode without a higher force reading indicating that a user is physically carrying the portable playback device 410.

Similarly, once the one or more onboard sensors detect no further forces or motions, the portable playback device 410 may determine that it is currently stationary. Such a determination may result in the deactivating of the command bypass mode. In some embodiments, the one or more onboard sensors determine that no movement is occurring when the force readings drop below a predetermined threshold. For example, a relatively small amount of force readings may be detected by the one or more onboard sensors from the actuation of the speaker itself. The portable playback device 410 may be configured to distinguish such force readings from actual movements.

Additionally, the one or more movement sensors may comprise sensors that are used to infer movement. For example, the one or more movement sensors may comprise sensors that are configured to detect the relative position of the portable playback device 410 with respect to other devices. For instance, the one or more movement sensors may utilize an Ultrawide Band (UWB) sensor, a Bluetooth Sensor, a WiFi Sensor, audio chirps, or some other wireless proximity detection sensor. Additional details regarding the detection of nearby playback devices, including the use of audio chirps, can be found, for example, in U.S. Pat. No. 11,188,294 entitled, "Detecting the nearest playback device," which is incorporated herein by reference in its entirety.

The one or more movement sensors may be configured to provide the portable playback device 410 with a proximity reading that indicates a distance or change in distance between the portable playback device 410 and one or more other devices. For example, the one or more movement sensors may detect a change in distance between the portable playback device 410 and one or more other playback devices 110 spread throughout an environment 101. Based upon the proximity reading indicating a detected change in relative distance between the portable playback device 410 and the other playback devices 110, the portable playback device 410 may generate a digital indication that the playback device is in motion. Such a digital indication may comprise an API call to activate the command bypass mode.

Some embodiments may utilize a combination of onboard sensors to identify movement. For example, the portable playback device 410 may initially utilize an accelerometer to detect movement and then switch to utilizing proximity readings to further track the motion. Further, in some embodiments, when utilizing proximity readings to infer motion, the portable playback device 410 may further detect a location of the portable playback device 410 within an environment 101. For example, based upon its relative location to other playback devices 110 (e.g., based upon the presence, absence, and/or relative strength of signals from other playback devices 110 within the environment 101), the portable playback device 410 may determine that it is within the main bedroom 101*b*. Further, the portable playback device 410 may call a network based API to update its location within the playback device system 100. Further, the portable playback device 410 may call a network API indicating that since it is moving, it will not execute at least a subset of commands. For instance, the portable playback device 410 may indicate that while in motion it will not execute commands directed towards bonded playback devices 110 that it is or was associated with. Additional details regarding the communication of playback device properties and status, can be found, for example, in U.S. Pat. No. 10,747,493 entitled, "Distributed provisioning of properties of operational settings of a media playback system," which is incorporated herein by reference in its entirety.

In an additional or alternative configuration, the proximity reading may comprise a relative distance between the portable playback device 410 and a wearable device 422 worn by a user. For example, a user may have an Apple Watch™ that she has associated with her media playback system 100. The one or more movement sensors (e.g., UWB sensor) may determine that the wearable device 422 is within a threshold distance of the portable playback device 410, for example, 12 inches, 6 inches, or 3 inches. Further, the proximity reading may indicate that the distance between the wearable device 422 and the portable playback device 410 is substantially consistent for a threshold amount of time, for example, one minute, 30 second, or 15 second. Based upon the distance between the portable playback device 410 and the wearable device 422 remaining substantially constant, the portable playback device 410 may generate a digital indication that the playback device is in motion. For example, the portable playback device 410 may infer that the distance between the portable playback device 410 and the wearable device 422 is remaining constant because the user is carrying the portable playback device 410.

Similarly, in some embodiment, the one or more onboard sensors may comprise a built-in microphone that is used determine whether the portable playback device 410 is in motion. For example, the portable playback device 410 may receive sound signals from the microphone. The sound may be compared to audio fingerprints captured from portable playback devices 410 in motion. For example, the fingerprints may be created through the acquisition of multiple audio recordings from portable playback device 410 as they are being moved. If the portable playback device 410 determines that data it is receiving from a microphone matches an audio fingerprint, the portable playback device 410 can infer that it is in motion.

Once the relative position of the portable playback device 410 with respect to other playback devices 110 stabilizes, the portable playback device 410 may determine that it is now stationary. In contrast, once the relative position of the portable playback device 410 with respect to the user's wearable device 422 increases beyond a threshold, the portable playback device 410 may infer that the user is no longer moving the portable playback device 410. Accordingly, the portable playback device 410 may infer that it is stationary. Once stationary, the portable playback device 410 may deactivate the command bypass mode. In some embodiments, the portable playback device 410 enters a delay period after determining that it is stationary and before deactivating the command bypass mode. For example, the playback device 410 may wait for a delay period of 1 second, ½ second, or 30 ms before deactivating the command bypass mode. Such a delay period may provide time for a user to fully remove her hands from the device after setting it down and avoid any accidently button presses that may occur while the user removes her hands from the device.

Figure 4C:
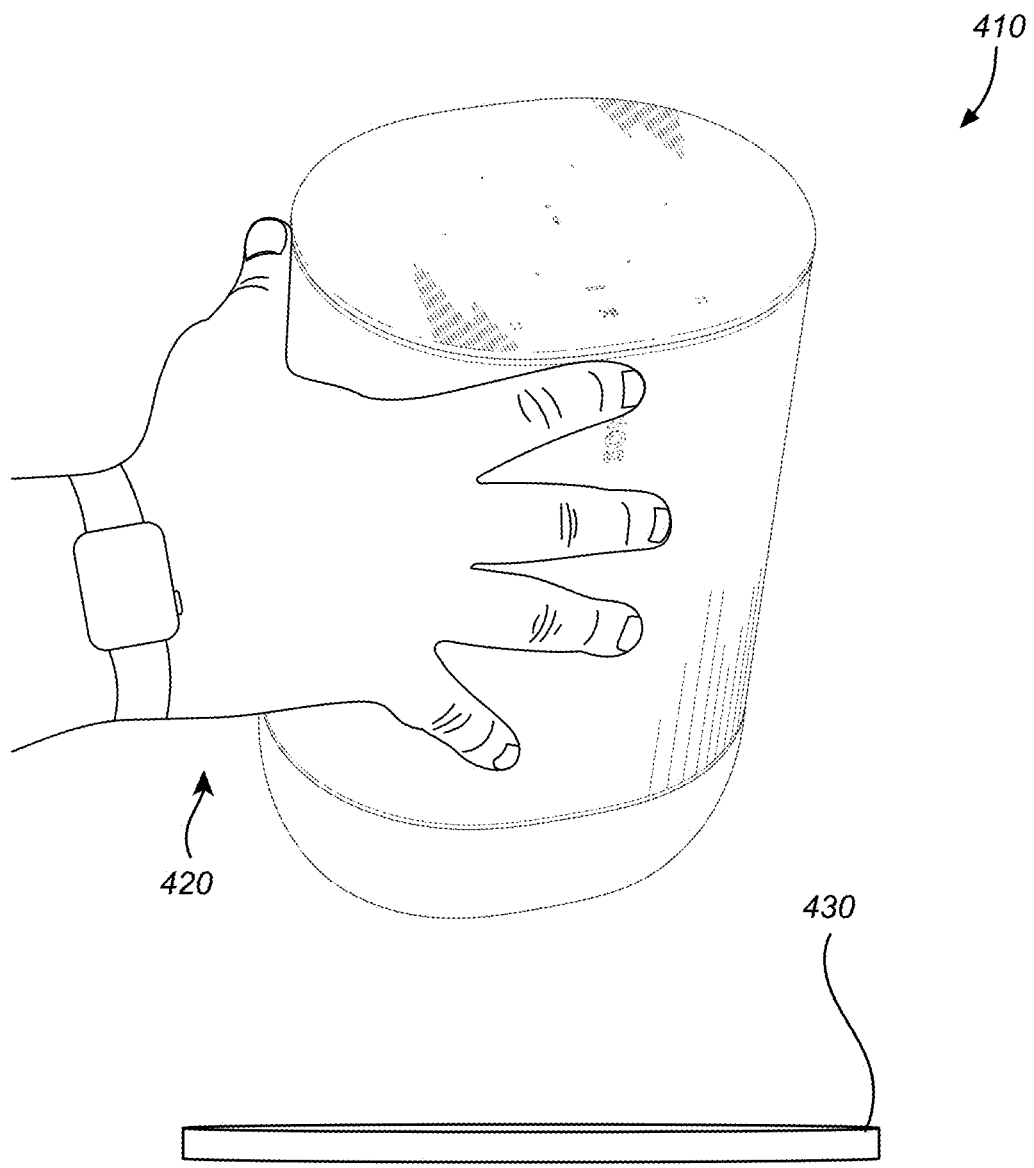
FIG. 4C is a view of a portable playback device being removed from a docking station.

FIG. 4C depicts the portable playback device 410 being removed from a docking station 430 by a user's hand 420. In the depicted embodiment, the one or more onboard sensors comprise a power circuit within the portable playback device 410. The power circuit is configured to generate a power source indication when the playback device is no longer attached to an external power source. The external power source may comprise, for example, an outlet that is powering the docking station 430. Additionally or alternatively, the portable playback device 410 is not associated with a docking station 430, but instead comprises a charging port that receives power directly from an external power source, such as an outlet or a USB port. The power circuit is configured to detect the loss of connection to the external power source. In some embodiments, the power circuit may comprise a voltage sensor or current sensor configured to detect a voltage potential when the portable playback device 410 is being charged. Additionally or alternatively, the power circuit may comprise a physical sensor, such as a spring-loaded switch or a magnetic sensor, or inductive sensor that is configured to detect when the portable playback device 410 is no longer in physical contact with the docking station 430 or with a power cable. When the portable playback device 410 is unplugged or undocked, the power source indication generated by the power circuit causes the portable playback device 410 to generate a digital indication that the playback device is in motion. In contrast, once the portable playback device 410 is again connected to the docking station 430 or a charging cable, the power circuit may generate an indication that the portable playback device 410 is no longer in motion, and the portable playback device 410 may exit the command bypass mode.

Figure 4D:
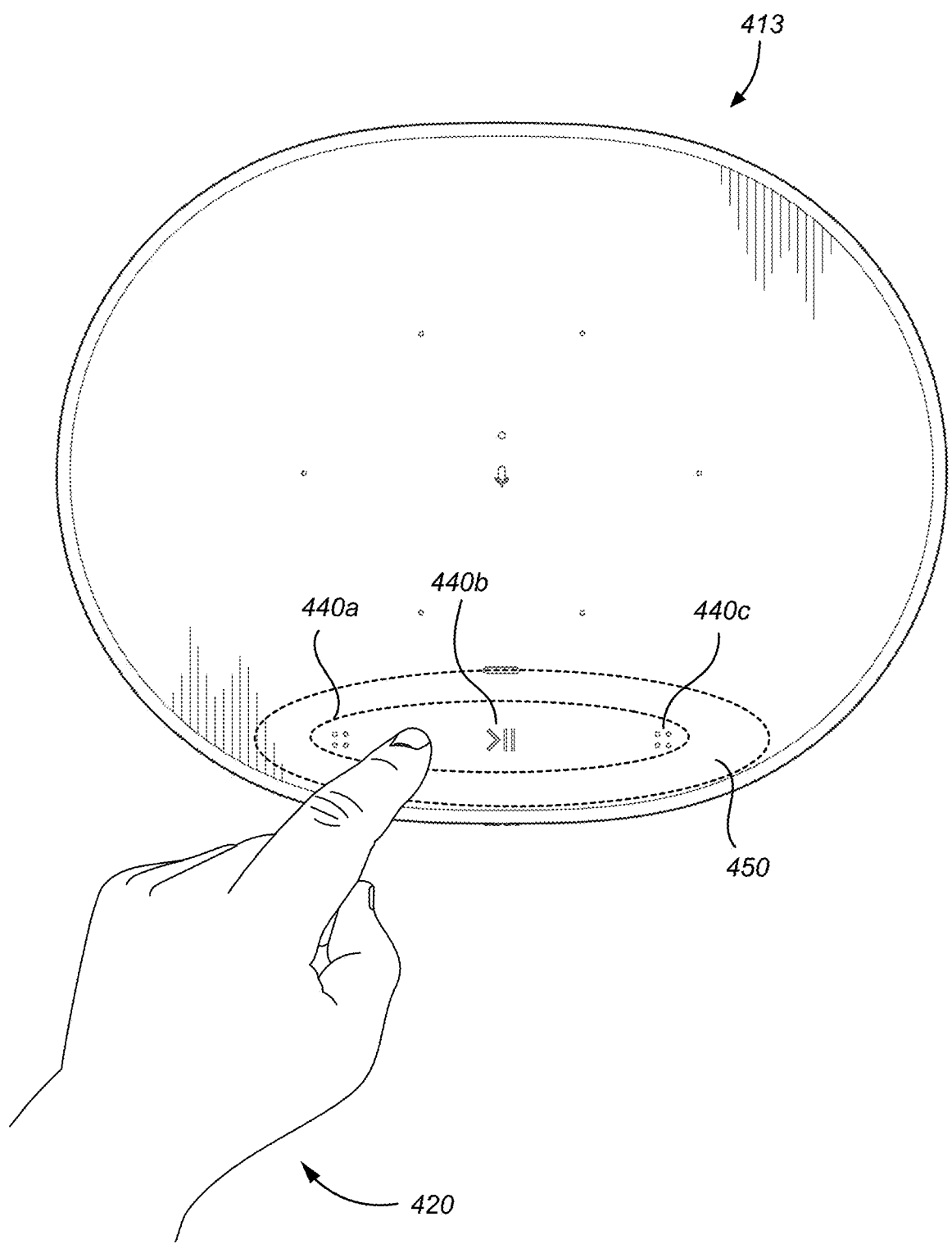
FIG. 4D is a view of a user interface of a portable playback device.
Figure 5:
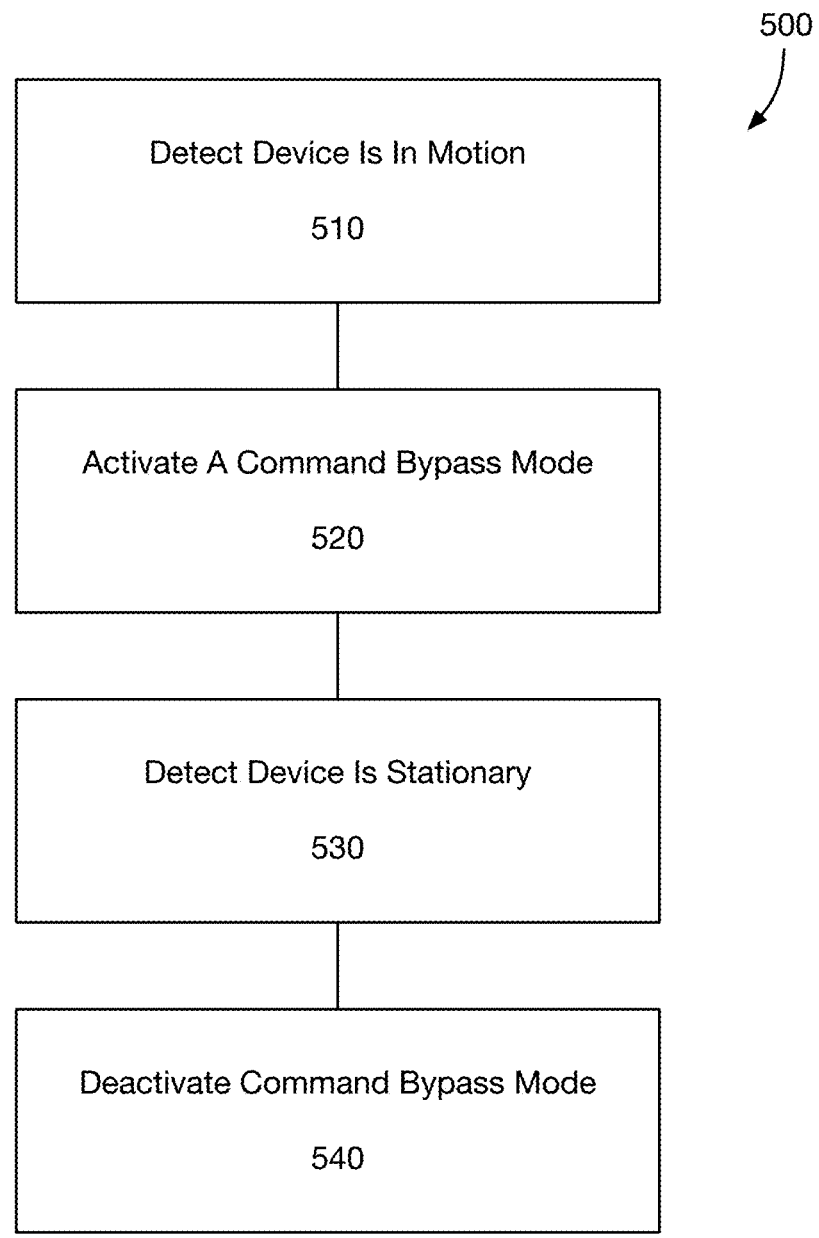
FIG. 5 is a flowchart of steps in a method for preventing accidental media device commands.

Additionally, in at least one embodiment, the one or more onboard sensors comprise a guard sensor 450 as depicted in FIG. 4D. As used herein, a "guard sensor" comprise a boundary area surrounding one or more user interface 440 (*a-c*) elements. In some embodiments, the guard sensor comprises a touch-sensitive boundary area that surrounds a user interface button 440. Additionally or alternatively, in some embodiments the guard sensor comprises a boundary formed by the sensor capabilities of the capacitive user interface buttons 440 that are able to detect the presence of a hand or finger that is nearby the user interface buttons 440 but not touching the user interface buttons 440.

For example, in FIG. 4D user interface elements 440*a*, 440*b*, and 440*c* comprise capacitive buttons useable to control the portable playback device 410. In the depicted example, the guard sensor 450 comprises a touch-sensitive capacitive boundary area adjacent to, and in this example surrounding, the user interface buttons 440. In various embodiments, the guard sensor 450 may generally follow the contours of a user interface button 440 and extend at least 0.5 inches from the user interface button 440. In at least one embodiment, the portable playback device 410 receives one or more inputs through the touch-sensitive user interface 440(*a-c*). Based on the user interaction with the guard sensor 450, the portable playback device 410 disregards the one or more inputs. For example, the portable playback device 410 may detect that the user is contacting both the touch-sensitive user interface 440(*a-c*) and the guard sensor 450. Based upon detecting that the user is contacting both the sensitive user interface 440(*a-c*) and the guard sensor 450, the portable playback device 410 may infer that the user is not intending to interact with user interface 440(*a-c*) but is instead moving the portable playback device 410. Accordingly, the portable playback device 410 generates a digital indication that the portable playback device 410 is in motion.

Additionally or alternatively, the guard sensor may comprise a boundary formed by the sensor capabilities of the capacitive user interface buttons 440. For example, the capacitive user interface buttons 440 may be sensitive enough to detect when a finger or hand is nearby the capacitive user interface buttons 440 but not physically touching the capacitive user interface buttons 440. Further, in some embodiments, the capacitive user interface buttons 440 may comprise the ability to distinguish between a hand and a finger. The capacitive user interface buttons 440 may function as a guard sensor by activating the bypass mode when a hand is detected above the capacitive user interface buttons 440 but not touching the capacitive user interface buttons 440. For instance, the portable playback device 410 may infer that the user is carrying the portable playback device 410 with the user's hand extending over the capacitive user interface buttons 440. In some embodiments, the disclosed capacitive user interface buttons 440 may utilize PSoC™ 4 and PSoC™ 6 MCU devices with CAPSENSE™ provided by Infineon™ of Munich, Germany.

Once the playback device 410 and/or the one or more onboard sensors generate the digital indication that the portable playback device 410 is in motion, the portable playback device 410 activates the command bypass mode. In some embodiments, activating the command bypass mode can comprise deactivating the touch-sensitive user interface 440(*a-c*) such that inputs are not receivable through the touch-sensitive user interface. Additionally or alternatively, the command bypass mode may comprise receiving the one or more inputs through the touch-sensitive user interface and then disregarding the one or more inputs.

In some embodiments, while the command bypass mode is active on the portable playback device 410, the portable playback device 410 receives a command from a second user interface that is different than the touch-sensitive user interface integrated into the playback device. In response to receiving the command, the portable playback device 410 executes the command. In some embodiments, the second user interface is at a control device 130 that is separate from the portable playback device 410. For example, the control device 130 may comprise a mobile phone and the second user interface may comprise a user interface on the mobile phone. Accordingly, even while in command bypass mode, the portable playback device 410 may execute commands received from a control device, such as a mobile phone.

Additionally, in some embodiments, some user interface buttons 440 may be associated with multiple functions. For instance, a particular button may (1) play or pause media content when the button is pressed for less than one second, (2) execute a swap command when the button is pressed for 1-3 seconds, or (3) enter a group command when the button is pressed for more than 3 seconds. In some embodiments, when the portable playback device 410 is in a command bypass mode the multifunction button may be limited to only a single function. For instance, the above exemplary button may only execute a play or pause function without regard to how long the button is pressed. In some cases, the command executed by a multi-function button during command bypass mode is user selectable. For example, a user may be able to select a command from a list of the multi-function commands that the user wishes to be executable within the command bypass mode.

Additionally, in some embodiments, a user may be able to override the command bypass mode. For example, if the same button is touched multiple times or for a threshold amount of time, the portable playback device 410 will override the command bypass mode and execute the requested command. When overriding the command bypass mode, the portable playback device 410 may be configured to only execute the command and/or button once. For instance, a continued press on the "skip" button may cause the portable playback device 410 to override a command bypass mode and execute the skip command once. Similarly, when overriding a button with a slider (e.g., a volume button or a track scan button) the portable playback device 410 may be configured to advance only a set predetermined amount. For instance, the volume would only increase by a predetermined increment and then stop. Further, in some embodiments, only certain commands and/or buttons are eligible to be overridden. For instance, when the command bypass mode is active, a user may not be allowed to override a volume button. The specific commands and/or buttons that are not eligible to be overridden may be set by the user in a preferences screen and/or may be predetermined defaults for the portable playback device 410.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods. The disclosed embodiments provide methods for mitigating and/or avoiding accidental user interface interactions while moving a playback device. Further example of playback devices and computing devices may similar be used as described herein.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   a communication interface;
   at least one processor; and
   at least one non-transitory computer-readable medium comprising program instructions that are executable by the at least one processor such that the playback device is configured to:
   detect, with one or more onboard sensors, that the playback device is in motion;
   activate a command bypass mode, wherein the command bypass mode causes the playback device to not execute commands applied to a touch-sensitive user interface integrated into the playback device;
   detect, with the one or more onboard sensors, that the playback device is stationary; and
   deactivate the command bypass mode.

2. The playback device of claim 1, wherein the program instructions that are executable by the at least one processor such that the playback device is configured to detect, with the one or more onboard sensors, that the playback device is in motion comprises program instructions that are executable by the at least one processor such that the playback device is configured to:
   receive a sensor reading from one or more movement sensors, wherein the one or more movement sensors comprise at least one of an accelerometer or a gyroscope; and
   based on the sensor reading, generate a digital indication that the playback device is in motion.

3. The playback device of claim 1, wherein the program instructions that are executable by the at least one processor such that the playback device is configured to detect, with the one or more onboard sensors, that the playback device is in motion comprises program instructions that are executable by the at least one processor such that the playback device is configured to:
   receive a proximity reading from one or more proximity sensors, wherein the proximity reading comprises an indication for a distance between the playback device and one or more other devices; and
   based on the proximity reading, generate a digital indication that the playback device is in motion.

4. The playback device of claim 3, wherein the program instructions that are executable by the at least one processor such that the playback device is configured to, based on the proximity reading, generate the digital indication that the playback device is in motion comprises program instructions that are executable by the at least one processor such that the playback device is configured to:
   determine that the proximity reading indicates the distance between the playback device and the one or more other devices is substantially consistent, wherein the one or more other devices comprise a wearable device; and generate the digital indication that the playback device is in motion.

5. The playback device of claim 1, wherein the program instructions that are executable by the at least one processor such that the playback device is configured to detect, with the one or more onboard sensors, that the playback device is in motion comprises program instructions that are executable by the at least one processor such that the playback device is configured to:
  receive a proximity reading from one or more proximity sensors, wherein the proximity reading comprises an indication for a change in distance between the playback device and one or more other devices; and
  based on the proximity reading, generate a digital indication that the playback device is in motion.

6. The playback device of claim 1, wherein the program instructions that are executable by the at least one processor such that the playback device is configured to detect, with the one or more onboard sensors, that the playback device is in motion comprises program instructions that are executable by the at least one processor such that the playback device is configured to:
  receive, from a power circuit within the playback device, a power source indication that the playback device is no longer attached to an external power source; and
  based on the power source indication, generate a digital indication that the playback device is in motion.

7. The playback device of claim 1, wherein the program instructions that are executable by the at least one processor such that the playback device is configured to activate the command bypass mode comprises program instructions that are executable by the at least one processor such that the playback device is configured to:
  deactivate the touch-sensitive user interface such that inputs are not receivable through the touch-sensitive user interface.

8. The playback device of claim 1, wherein the program instructions that are executable by the at least one processor such that the playback device is configured to activate the command bypass mode comprises program instructions that are executable by the at least one processor such that the playback device is configured to:
  receive one or more inputs through the touch-sensitive user interface; and
  disregard the one or more inputs.

9. The playback device of claim 1, wherein the program instructions that are executable by the at least one processor such that the playback device is configured to activate the command bypass mode comprises program instructions that are executable by the at least one processor such that the playback device is configured to:
  detect a user interaction with a guard sensor, wherein the guard sensor is positioned adjacent to a touch-sensitive user interface;
  receive one or more inputs through the touch-sensitive user interface; and
  based on the user interaction with the guard sensor, disregard the one or more inputs.

10. The playback device of claim 1, wherein the at least one non-transitory computer-readable medium further comprises program instructions that are executable by the at least one processor such that the playback device is configured to:
  while the command bypass mode is active on the playback device, receive a command from a second user interface, wherein the second user interface is different than the touch-sensitive user interface integrated into the playback device; and
  execute the commands at the playback device.

11. The playback device of claim 10, wherein the second user interface is at a control device that is separate from the playback device.

12. A computer-implemented method for causing a playback device to operate within a command bypass mode, the computer-implemented method executed by a processor at the playback device, the computer-implemented method comprising:
  detecting, with one or more onboard sensors, that the playback device is in motion;
  activating a command bypass mode, wherein the command bypass mode causes the playback device to not execute commands applied to a touch-sensitive user interface integrated into the playback device;
  detecting, with the one or more onboard sensors, that the playback device is stationary; and
  deactivating the command bypass mode.

13. The computer-implemented method of claim 12, wherein detecting, with the one or more onboard sensors, that the playback device is in motion further comprises:
  receiving a sensor reading from one or more movement sensors, wherein the one or more movement sensors comprises at least one of an accelerometer or a gyroscope; and
  based on the sensor reading, generating a digital indication that the playback device is in motion.

14. The computer-implemented method of claim 12, wherein detecting, with the one or more onboard sensors, that the playback device is in motion further comprises:
  receiving a proximity reading from one or more proximity sensors, wherein the proximity reading comprises an indication for a distance between the playback device and one or more other devices; and
  based on the proximity reading, generating a digital indication that the playback device is in motion.

15. The computer-implemented method of claim 14, wherein generating the digital indication that the playback device is in motion further comprises:
  determining that the proximity reading indicates the distance between the playback device and the one or more other devices is substantially consistent, wherein the one or more other devices comprise a wearable device; and
  generating the digital indication that the playback device is in motion.

16. The computer-implemented method of claim 14, wherein generating the digital indication that the playback device is in motion further comprises:
  determining that the proximity reading indicates the distance between the playback device and the one or more other devices is changing, wherein the one or more other devices comprise another playback device; and
  generating the digital indication that the playback device is in motion.

17. The computer-implemented method of claim 14, wherein detecting, with the one or more onboard sensors, that the playback device is in motion further comprises:
  receiving, from a power circuit within the playback device, a power source indication that the playback device is no longer attached to an external power source; and
  based on the power source indication, generating a digital indication that the playback device is in motion.

18. The computer-implemented method of claim 12, wherein activating the command bypass mode further comprises:

deactivating the touch-sensitive user interface such that inputs are not receivable through the touch-sensitive user interface.

19. The computer-implemented method of claim 12, wherein activating the command bypass mode further comprises:
   receiving one or more inputs through the touch-sensitive user interface; and
   disregarding the one or more inputs.

20. The computer-implemented method of claim 12, further comprising:
   while the command bypass mode is active on the playback device, receiving a command from a second user interface, wherein the second user interface is at a control device that is separate from the playback device; and
   executing the commands at the playback device.

* * * * *